(No Model.)

G. J. LAWRENCE.
REIN SUPPORTER.

No. 442,381. Patented Dec. 9, 1890.

on line x–x

Witnesses:
M. M. Mortimer
F. Stanly Elmore

Inventor:
G. J. Lawrence
by his Atty
B. T. Dodge

UNITED STATES PATENT OFFICE.

GEORGE J. LAWRENCE, OF AURORA, ILLINOIS.

REIN-SUPPORTER.

SPECIFICATION forming part of Letters Patent No. 442,381, dated December 9, 1890.

Application filed May 3, 1890. Serial No. 350,459. (No model.)

*To all whom it may concern:*

Be it known that I, GEORGE J. LAWRENCE, of Aurora, in the county of Kane and State of Illinois, have invented certain Improvements in Rein-Guiding Attachments for Harness, of which the following is a specification.

The object of this invention is to provide an attachment applicable to existing harness for the purpose of holding or guiding the reins to prevent them from falling over the hips of the animal, becoming crossed, or being caught under the animal's tail, and also, incidentally, adapted to sustain the traces when not in use.

Figure 1:
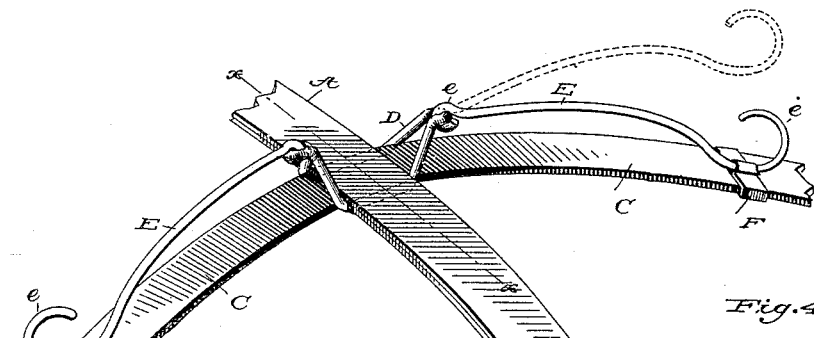
Figure 4:
Figure 2:
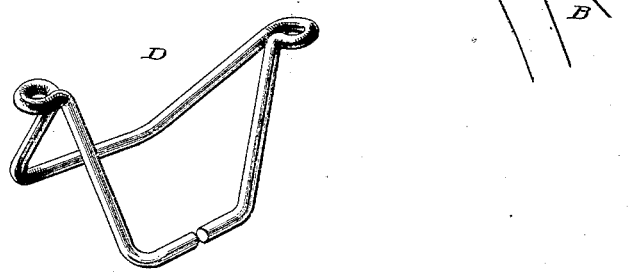
Figure 3:
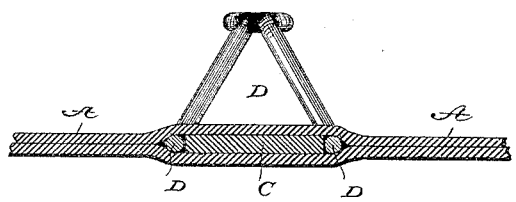

In the accompanying drawings, Figure 1 is a perspective view of a portion of the back and hip straps of an ordinary harness with my improvement applied thereto. Fig. 2 is a perspective view of the central member of my attachment. Fig. 3 is a longitudinal vertical section on the line $x\,x$ of Fig. 1. Fig. 4 is a perspective view of a detail.

Referring to the drawings, A represents the back-strap to which the crupper B is attached, and C is the hip-strap passed through or between the two layers of the back-strap in the ordinary manner. The foregoing parts may be constructed and arranged in the particular manner shown or in any other equivalent manner.

In carrying my invention into effect I provide a central member or support D, of the form shown in Fig. 2 or of equivalent form, adapted to be passed through the back-strap and to receive the hip-strap between its horizontal arm. The two ends of this piece are turned upward and formed with eyes to receive and sustain the ends of two arms or wires E, which are hooked therein, as shown, or otherwise attached thereto.

As regards the member D, it is commonly constructed of wire. Its form may be modified, provided only it is adapted for connection with the back-strap and elevated at its ends to sustain the arms E E.

The arms E are extended downward over the respective hip-straps and turned upward at their lower ends in the form of hooks $e$. Near the lower end each of the arms E is passed through an eye upon or otherwise secured to a clasp F, adapted to engage the hip-strap. It will be observed that each of the arms is thus connected at its upper end to the support D and at its lower end by the clasp to the hip-strap, and that between each of the arms and the underlying hip-strap there is an elongated space or opening for the passage of the rein, which, being loosely retained by the overlying arm, is kept in proper position and prevented from slipping downward over the hips of the animal.

The clasps F are commonly mounted to slide freely on the hip-straps, in order that they may adapt themselves to the changing position of the latter when the harness is hung in the stable, and also that the harness may be used on animals differing in form and size.

In some cases it may be advisable to pass the driving-reins over the arms E and within their hooked ends $e$, instead of passing them beneath the arms. The upturned hooked ends $e$ are commonly used for the purpose of supporting the traces or tugs when the harness is in place upon the animal and unattached to the vehicle.

The jointed connection between the arms E and the supporting member D is advantageous, in that it permits the arms to change their relations to each other and to the member D, as the varying positions of the hip-straps may demand.

In applying my device to existing harness I commonly introduce the member D through the back-strap before the insertion of the hip-strap to its place. The hip-strap being then introduced, as shown in the drawings, through the back-strap and between the horizontal arms of the part D, it secures the latter firmly in position.

When the device is to be applied to the harness at the factory as a permanent portion thereof, the outer ends of the arms E may be secured to the hip-straps by screws or other ordinary fastenings in place of the clasps F.

In certain cases I propose to detachably secure the outer ends of the arms E to the back-strap by means of a catch or clasp of the form shown to the right in Figs. 1 and 4, or of any equivalent form which will admit of the outer ends of the arms being readily detached and again secured in place, and the arms raised to the position shown in dotted lines.

The clasp represented in the drawings consists of a spring-plate embracing the back-strap and having its ends arranged near together so that they will yield to admit of the insertion or removal of the end of the arm. By adapting the arm to be thus elevated at will their ends may be passed through the meshes of a fly-net when it is applied to the horse. Further, the reins may be more readily placed between the arms and the back-straps by inserting them from the outside. Further, the cleaning of the harness is facilitated in consequence of the free access afforded to the upper part of the back-strap.

Having thus described my invention, what I claim is—

1. The rein-guiding attachment for a harness, consisting of the central member having elevated ends and adapted for application to the back-strap, the arms E, having a jointed connection with member D, and means, substantially as shown, for attaching the outer ends of arms E to the hip-strap, whereby the reins are separately guided and prevented from crossing and the arms permitted to adjust themselves to animals differing in size and form.

2. In combination with the back-strap A and hip-strap C, the member D, inserted through the back-strap astride of the hip-strap, the arms E, attached to said member, and the clasps F, connecting the arms E with the hip-strap.

3. In a harness, and in combination with the back and hip straps, the central member D and the arms E overlying the hip-strap, with space thereunder for the passage of the reins, their outer or lower ends curved, substantially as described, to sustain the traces.

4. In a rein-guiding attachment for a harness, the combination, with the central member D, adapted for application to the back-strap, of the arms E, jointed thereto at their inner ends and having their outer ends detachably secured to the back-strap, substantially as described.

In testimony whereof I hereunto set my hand, this 21st day of April, 1890, in the presence of two attesting witnesses.

GEORGE J. LAWRENCE.

Witnesses:
W. R. KENNEDY,
PHIL. T. DODGE.